United States Patent [19]
Clark

[11] 3,913,945
[45] Oct. 21, 1975

[54] BICYCLE WITH VARIABLE SPEED LEVER ACTION DRIVE

[76] Inventor: Marion A. Clark, 546 W. Pleasant, Tulare, Calif. 93274

[22] Filed: May 1, 1974

[21] Appl. No.: 465,885

[52] U.S. Cl. ............ 280/233; 280/243; 280/251; 280/255; 280/300
[51] Int. Cl.² .................. B62M 1/04; B62M 23/00
[58] Field of Search .......... 280/255, 224, 225, 232, 280/233, 251, 236, 238, 256, 257, 243, 300

[56] References Cited
UNITED STATES PATENTS

| | | | |
|---|---|---|---|
| 584,200 | 6/1897 | Wheatley | 280/255 |
| 813,741 | 2/1906 | Rudbeck | 280/233 |
| 849,342 | 4/1907 | Swinbank | 280/255 |
| 2,630,333 | 3/1953 | Petersen | 280/255 |
| 3,375,023 | 3/1968 | Cox | 280/255 |
| 3,661,404 | 5/1972 | Bossaer | 280/255 |
| 3,759,543 | 9/1973 | Clark | 280/255 |
| 3,834,733 | 9/1974 | Harris | 280/251 |

FOREIGN PATENTS OR APPLICATIONS 8,247  2/1896  United Kingdom ................ 280/233

*Primary Examiner*—Samuel Scott
*Assistant Examiner*—Allan R. Burke
*Attorney, Agent, or Firm*—Brown & Martin

[57] ABSTRACT

A bicycle pedalled by a lever action drive, in which levers are pivotally mounted at the front of the frame and extend rearwardly on both sides. Each pedal lever is coupled by a cable to a chain which drives the rear wheel through a one way clutch, the chain being spring returned and the spring and chain being enclosed in the tubular frame. The cables have adjustable connections to the levers to vary the effective lever arm and thus the drive ratio. An over center booster spring assists the lever action, and an overdrive action is available by moving idler pulleys into the path of the drive cables. The pedal levers and adjustable drive means are independently operable.

5 Claims, 4 Drawing Figures

BICYCLE WITH VARIABLE SPEED LEVER ACTION DRIVE

BACKGROUND OF THE INVENTION

The conventional type of bicycle drive uses pedals on crank arms on a common shaft, driving an endless chain and sprocket assembly to turn the rear wheel. With this arrangement, maximum leverage is applied over a portion of the circle of pedal rotation, the power application at the top and bottom positions of the pedals being inefficient. Pump or lever action drives have been developed, but have involved complex arrangements of linkages, chains, large gear sectors and the like, which are clumsy and can be dangerous to the rider when exposed on the bicycle.

SUMMARY OF THE INVENTION

The bicycle described herein is driven by a pair of pedal levers pivoted at their forward ends and extending rearwardly on opposite sides of the frame, with foot pedals at their rearmost ends substantially below the saddle of the bicycle. The stroke of the rider's legs is thus near vertical, allowing the full weight to be applied effectively. Each lever is connected by a cable to a chain which extends around a sprocket on the rear wheel, the dual sprockets having one way clutches so that either lever can drive the wheel. The chain is spring returned, the spring and the major portions of the chain and cable being concealed in the tubular frame of the bicycle. The levers are arcuate along their lengths and each cable is connected to its respective lever by a shift unit, which is movable along the lever to vary the effective lever arm. The shift units are locked in place frictionally by tension on the cables and are provided with manually operable release means for quick shifting. The cables pass over guide pulleys below the saddle, and adjacent the guide pulleys are idler pulleys which can be moved manually into the cable paths to increase cable extension and provide an overdrive effect. An over center booster spring assists pedal action and incorporates a stop which limits lever motion at both ends of the travel.

Guard plates on the rear of the frame provide protection for the levers if the bicycle is knocked down, the plates also providing a mounting for a folding support stand with small wheels which facilitate backing and turning the bicycle.

The primary object of this invention, therefore, is to provide a new and improved bicycle with a variable speed lever action drive.

Another object of this invention is to provide a bicycle with lever action drive, portions of which are concealed in the frame.

Another object of this invention is to provide a bicycle with lever action drive, in which the levers are independently operable and each lever has speed shifting means thereon.

A further object of this invention is to provide a bicycle with lever action drive incorporating a selectively operable overdrive mechanism.

Other objects and advantages will be apparent upon reading the following description, taken in conjunction with the drawing, in which.

DESCRIPTION OF THE PREFERRED EMBODIMENT

Figure 1:
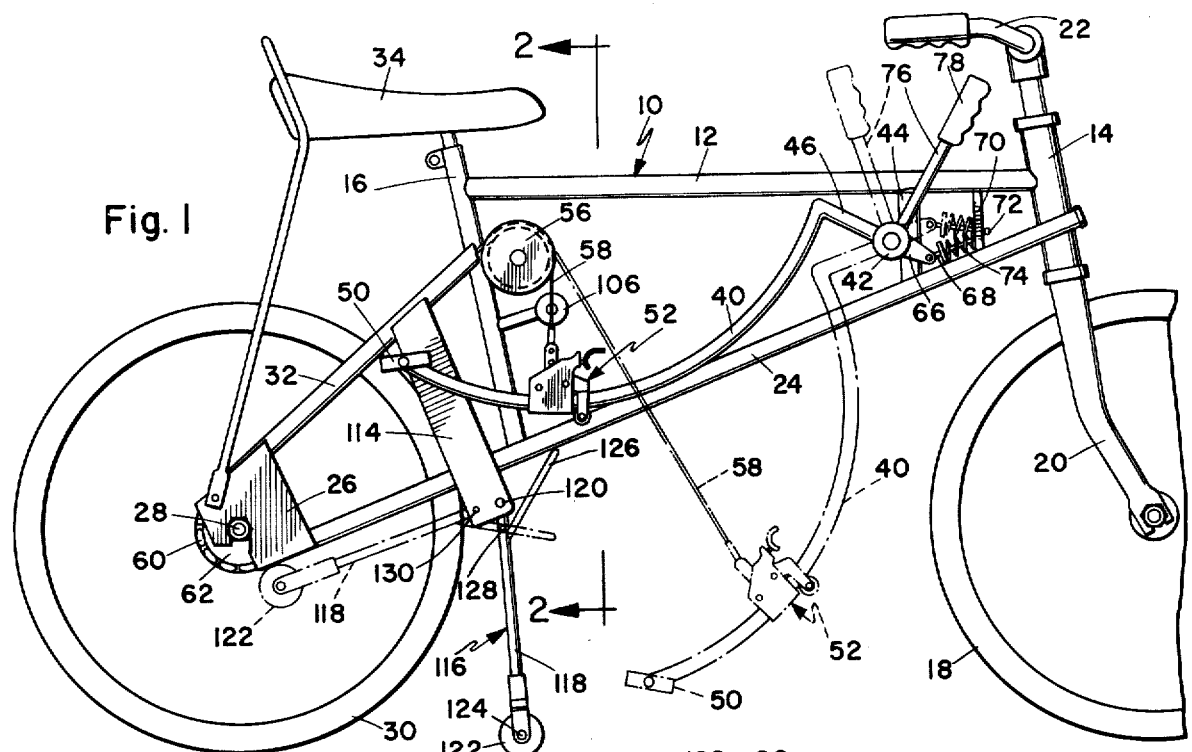
FIG. 1 is a side elevation view of a bicycle incorporating the lever action drive.

The bicycle frame 10 comprises a top bar 12 connecting a front fork tube 14 and a rear saddle post 16, the front fork tube carrying a wheel 18 in a fork 20, with a conventional handlebar 22. A pair of tubular side rails 24 extend diagonally downwardly from the front fork tube 14 to bearing plates 26, which hold the axle 28 of rear wheel 30. The rear wheel is supported by bracing tubes 32 between bearing plates 26 and the upper portion of saddle post 16, on which a suitable saddle 34 is mounted. The drive mechanism to be described is duplicated in its entirety on both sides of frame 10, and rear wheel 30 is provided with oppositely handed one way clutches 36 and 38, so that the two drive assemblies may be used independently or together to drive the wheel.

Each drive assembly includes a pedal lever 40 attached at its forward end to a bearing collar 42, which is pivotally mounted on a support 44 between top bar 12 and side rail 24. Lever 40 is arcuate along its length and has a forward bar portion 46 projecting substantially radially from the bearing collar, the main arcuate portion extending alongside and close to the frame 10, with a foot pedal 50 attached to the rear end thereof generally below the saddle 34. The arcuate lever swings substantially vertically and is concave downwardly to provide a track for a shift unit 52, which will be described in detail hereinafter.

Fixed to the saddle post 16 below top bar 12 is a support bearing 54 carrying a freely rotatable guide pulley 56. From shift unit 52 a cable 58 passes over guide pulley 56 and down through bracing tube 32. The cable 58 is secured to a chain 60 which passes around a sprocket 62 on the rear wheel, the sprocket being connected to drive the wheel through clutch 36. Chain 60 extends into side rail 24 and is connected to a return spring 64, which is secured in any suitable manner at the forward end of the side rail. When lever 40 is pushed down by the rider's foot on pedal 50, as indicated in the broken line position in FIG. 1, chain 60 is pulled to rotate sprocket 62 and turn the rear wheel. When the lever is released, the return spring 64 retracts the chain and pulls the lever back to the up position.

On the bearing collar 42 an arm 66 projects opposite to bar portion 46, the arm being connected to a stop pin 68 which passes slidably through a stop plate 70 fixed on frame 10. On the forward end of stop pin 68 is an enlarged stop 72 which bears against stop plate 70 and limits the swing of lever 40. Between arm 66 and stop plate 70 is a booster spring 74, which is compressed as the arm 66 passes over center and provides an assist to the continued motion of the lever. For additional power application a handle 76 extends from bearing collar 42 perpendicular to bar portion 46, and has a hand grip 78 to allow manual assist of the foot pedal action.

Shift unit 52 comprises a saddle bracket 80 which fits under and straddles the arcuate lever 40. Pivotally mounted in the saddle bracket 80 is a bellcrank 82, having a fork 84 which straddles the lever from above and carries a front roller 86 to roll on the underside of the lever. At the upper end of fork 84 is a concave clamp face 88 to fit over the top of lever 40. Bellcrank 82 has an upwardly extending lug 90 rearwardly of its pivot pin 92, cable 58 being attached to the lug by a connector 94. Pivotally attached to lug 90 is an actuating pin 96, which extends forwardly and is slidable in a cross plate 98 on the upper portion of saddle bracket 80. On the forward end of actuating pin 96 is a finger grip 100, the portion of the saddle bracket immediately rearward of the cross plate 98 having concave portions 102 for thumb support. Rotatably mounted in the saddle bracket below the rear portion of bellcrank 82 is a freely rotatable rear roller 104 to ride on top of lever 40.

Figures 2, 3, 4:
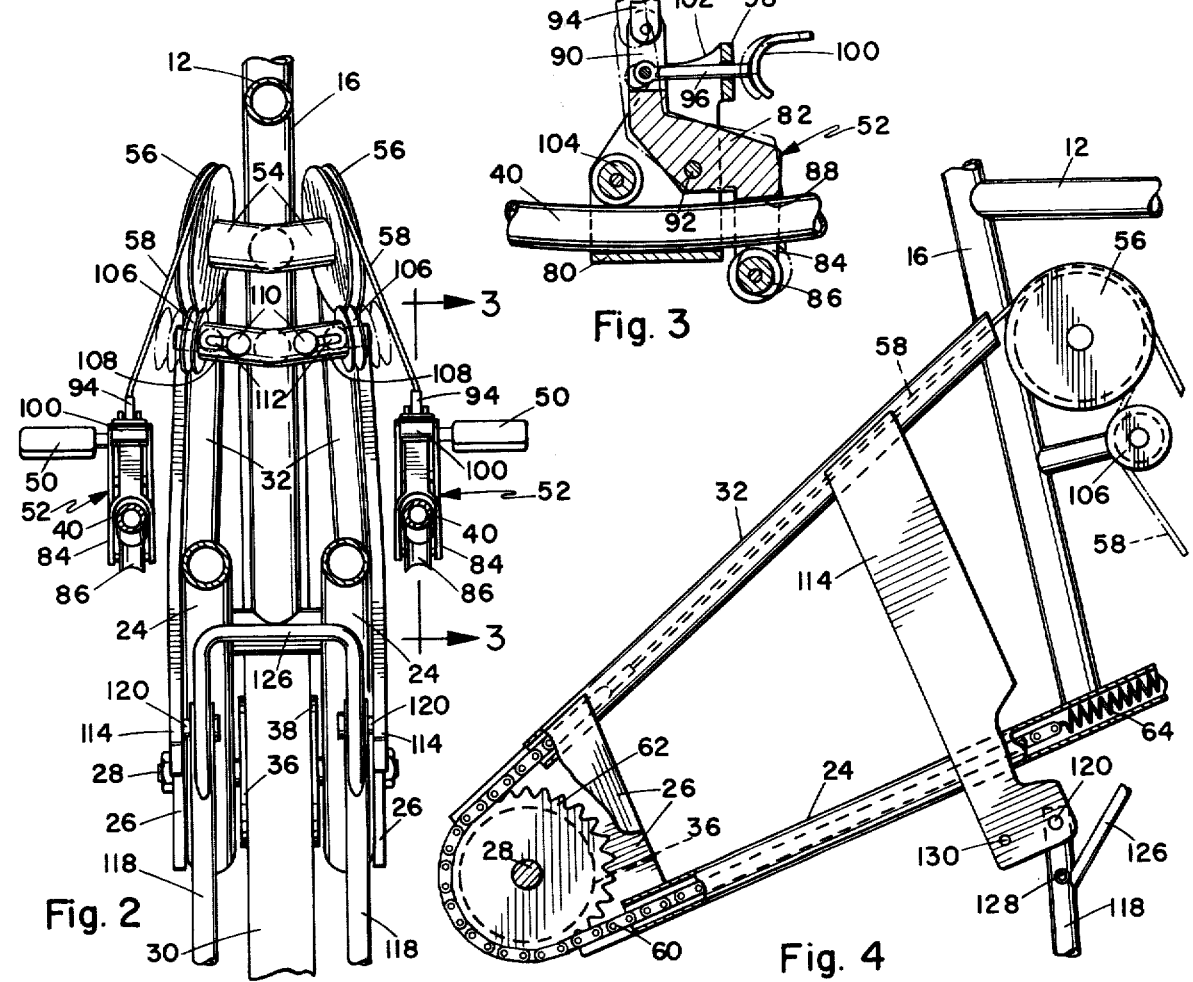
FIG. 2 is an enlarged sectional view taken on line 2—2 of FIG. 1.
FIG. 3 is an enlarged sectional view taken on line 3—3 of FIG. 2.
FIG. 4 is an enlarged side view of the rear portion of the bicycle, with portions cut away to show the drive mechanism.

Tension on cable 58 pulls up on lug 90, which pivots the bellcrank and grips lever 40 between concave clamp face 88 and the lower portion of unit 52 along lever 40 and change the effective lever arm, the rider's thumb and finger are used on concave portions 102 and finger grip 100 with a squeezing action, which pulls front roller 86 up against lever 40 as in the broken line position in FIG. 3. With the tension of cable 58 relieved, saddle bracket 80 can be held clear of the lever 40 and the shift unit will roll in either direction along the lever, supported by rollers 86 and 104, to change the speed ratio as required.

Immediately below the guide pulley 56 is an overdrive pulley 106 axially slidable mounted in a bearing sleeve 108, which is fixed on saddle post 16. In the inoperative position, shown in full line in FIG. 2, the overdrive pulley is offset inwardly from the guide pulley and clear of the path of cable 58. In the operative position, indicated in broken line in FIG. 2, the overdrive pulley 106 is pulled out into alignment with guide pulley 56 and cable 58 is passed behind the overdrive pulley, as in FIG. 4.

This lengthens the effective cable path and allows more cable to be extended by a pedal stroke, providing an overdrive action. The overdrive pulley 106 is operated manually by a control knob 110 extending from a slot 112 in bearing sleeve 108. Any suitable frictional means may be used to hold the overdrive pulley in the two positions.

Fixed between bracing tubes 32 and side rails 24 on each side are guard plates 114, which prevent the levers 40 from being bent into the frame if the bicycle falls down. The lower ends of guard plates 114 extend below side rails 24 to provide support for a kick stand 116. The kick stand has a pair of legs 118, pivotally attached at their upper ends to the guard plates by hinge pins 120. At the lower end of each leg 118 is a small wheel. 122, the axle 124 of which may be extended to allow positioning of the kick stand by the rider's foot. The upper ends of legs 118 are connected by a forwardly inclined yoke 126, which acts as a stop against side rails 24 in the down position of the kick stand. The wheels 122 support the rear of the bicycle with the rear wheel slightly clear of the ground, so that the bicycle can be backed up and turned easily from a parked position. The kick stand folds rearwardly on opposite sides of the rear wheel and is held in folded position by any suitable detent, such as a spring button 128 engaging in a socket 130 in guard plate 114.

The forward pivoting of the pedal levers and the positioning of the foot pedals below the saddle allows a near vertical motion of the rider's legs. This facilitates putting full weight on the pedals when necessary, which together with manual assistance on handles 76, can provide a very powerful drive action. Speed can be shifted quickly at any time by sliding the shift units along the levers. Since the levers can be operated independently, one can be used to continue pedalling while speed is shifted on the other. On level surfaces the overdrive is easily engaged, the pulleys 106 being readily accessible to the rider. Return springs 64 normally hold the pedal levers in the up position, so that a full stroke can be applied when starting.

Having described my invention, I claim:

1. In a bicycle having a frame with a forward end portion, and a rear portion with a driven rear wheel mounted therein, a variable speed lever action drive mechanism comprising:

a pair of pedal levers having forward ends with pivotal attachment to the frame at the forward end portion to swing substantially vertically on opposite sides of the frame, said levers extending rearwardly and having foot pedals at the rear ends thereof;

said rear wheel having a pair of sprockets, with individual one way clutches coupled to drive the wheel in a forward direction;

a shift unit slidably mounted on each of said levers;

a drive chain passing around each of said sprockets;

said frame having guide pulleys rotatably mounted on the rear portion thereof;

each of said chains having a cable extending from one end and over one of the guide pulleys to the respective shift unit, and a return spring connected between the frame and the other end of each chain to bias the respective lever upwardly;

said frame having tubular portions in which said return springs and portions of said chains and cables are enclosed.

2. The structure of claim 1, wherein each of said levers has an arm extending therefrom adjacent the pivot, a booster spring mounted between each arm and the frame for compression by over center motion of the arm during swinging of the lever, and stop means connected between each arm and the frame for limiting motion of the lever.

3. The structure of claim 1, and including guard plates on opposite sides of the rear portion of said frame, between the frame and the path of motion of the rear ends of said levers.

4. The structure of claim 1, wherein each of said shift units comprises a saddle bracket straddling the lever, a bell crank pivotally mounted in the saddle bracket and having a clamp portion for engagement with the lever, said cable being connected to the bellcrank offset from the pivot to apply clamping pressure under tension of the chain, and hand operable squeeze action actuating means mounted on said saddle bracket and coupled to the bellcrank for releasing clamping pressure.

5. The structure of claim 3 and including a kick stand pivotally attached to said guard plates, said kick stand having ground engaging wheels rotatably mounted thereon on an axis parallel to the axis of said rear wheel.

* * * * *